R. S. REQUA.
HOLLOW TILE.
APPLICATION FILED SEPT. 18, 1918.

1,341,071.

Patented May 25, 1920.
2 SHEETS—SHEET 1.

INVENTOR.
RICHARD S. REQUA.
BY A B Bowman
ATTORNEY

INVENTOR.
RICHARD S. REQUA.
BY A. B. Bowman
ATTORNEY

UNITED STATES PATENT OFFICE.

RICHARD S. REQUA, OF SAN DIEGO, CALIFORNIA.

HOLLOW TILE.

1,341,071.   Specification of Letters Patent.   Patented May 25, 1920.

Application filed September 18, 1918. Serial No. 254,536.

*To all whom it may concern:*

Be it known that I, RICHARD S. REQUA, a citizen of the United States, residing at San Diego, in the county of San Diego and State of California, have invented certain new and useful Improvements in Hollow Tile, of which the following is a specification.

This invention relates to an improvement in interlocking hollow building tile or block, constructed in a single unit form, with the parts thereof so arranged and relatively disposed that such single unit may be quickly and readily divided to produce any special form of tile required in a building construction.

In constructing buildings of tile of this class it is of course well known that the majority of tile used will follow a single form, but it is also well known that many tile of a form other than the general form will not only be required, but absolutely necessary. Heretofore tile manufacturers have met this demand by making a tile of general form, and also making special form tile required, each as a separate tile structure.

So far as I am aware it has never been suggested that a single tile unit could be so constructed as to answer all requirements in its original form as a general building tile, and yet have its interior web arrangement so designed that it could, when properly divided, produce any special type of tile in complete form, that might be, or is, required in the building construction.

This is the object of the present invention, namely, to produce a single tile unit having all the essential requirements of a general building tile of the best accepted type, and yet so constructed in its inherent details that it may be easily divided to produce any special form of tile required in the building construction.

The advantages of such a tile will at once be apparent. First, the tile manufacturer is saved the expense of the many dies and equipment required to produce the many special forms, and he is not required to carry the large stocks of the special tile in order that he may promptly fill his orders, thereby making it possible to supply the tile much more cheaply to the builders. Second, the contractor's work of estimating and ordering is greatly simplified and he does not have to allow in his estimates for quantities of the special forms which he is compelled to order to provide for contingencies, and which may be left on his hands when the building is completed. This is always quite an item, especially when the distance is great between the source of supply and the locality of the building. Third, the work of the tile mason is greatly simplified and consequently cheapened, as with a supply of the tile of general form always at hand, he can quickly produce any of the special forms he may require by dividing such general tile.

The type of tile of general form commercially desired is an interlocking tile, where one section of one tile interfits with a section of another. Such tile is hollow, and has heretofore been supplied with interior strengthening webs. It is primarily in the disposition of these webs that the advantage of the present tile is gained, as by this invention the webs are so arranged that each and all aline with some portion of the external wall of the tile unit, or general form, so that when divided to expose the particular web, such web completes an external wall of a new form. Now with a knowledge of the various types of special tile required, in a building structure, such webs may be disposed to permit dividing the tile unit with such relation to one or more of such webs, that any of the desired special forms may be produced.

In the drawings:—

Figs. 3, 4, 5, 6, and 7 are sectional views illustrating some of the special forms required in a building construction, and which special forms may be constructed from the improved tile by a simple and proper dividing of such tile.

Figure 8:
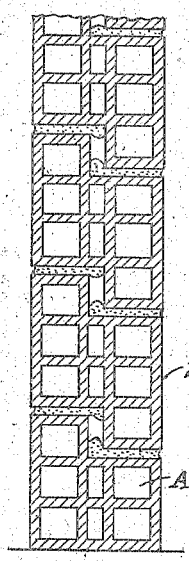
Figure 9:
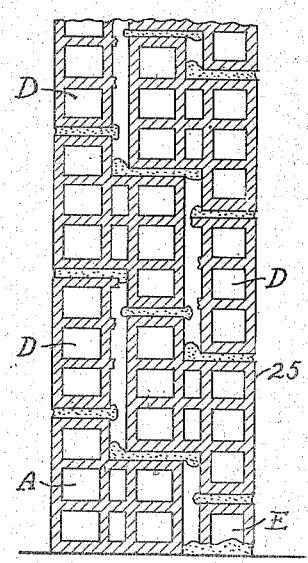
Figure 10:
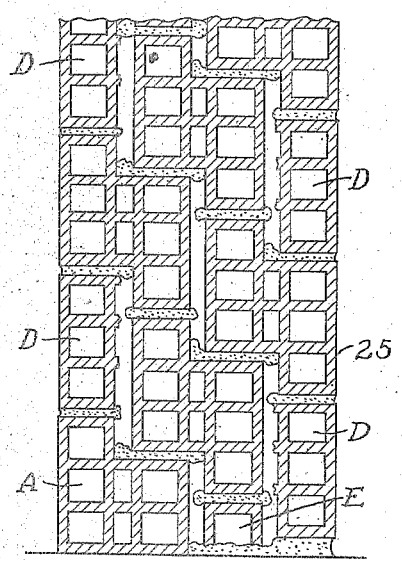

Figs. 8, 9, and 10 represent vertical sectional views of simple walls of different standard thicknesses, as eight, thirteen, and seventeen inches, respectively, certain of the special forms being used.

Figure 11:
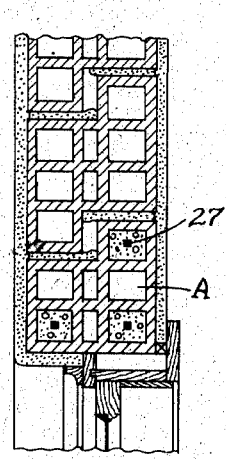
Figure 12:
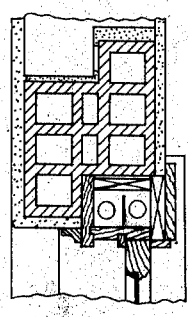
Figure 13:
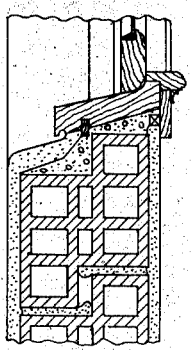

Figs. 11, 12, and 13, indicate respective sectional views of the head, jamb, and sill construction of a double-hung window, illustrating the use of special forms made from the general tile unit of this invention.

Figure 14:
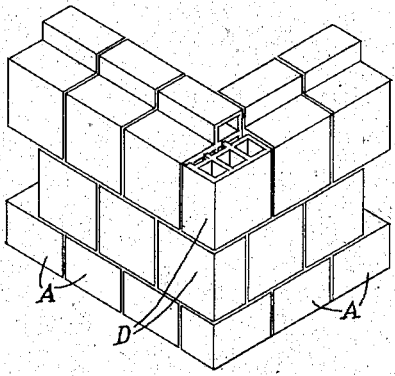

Fig. 14 is a perspective view of a corner construction, using a special form of tile.

Figure 15:
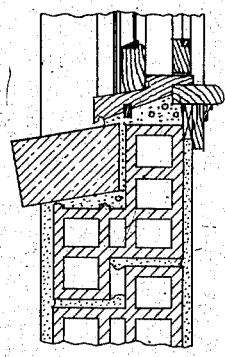

Fig. 15 is a sectional view of a brick-sill window, illustrating the use of another special form of tile.

Figure 16:
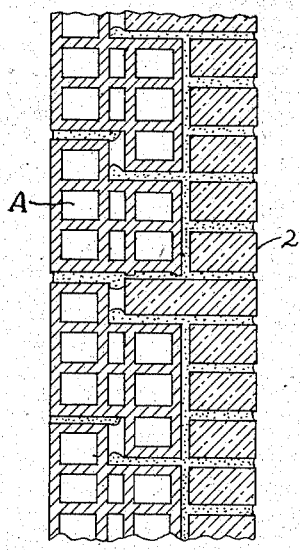

Fig. 16 is a sectional view, showing another special form of tile used in building brick-veneered walls.

Figure 17:
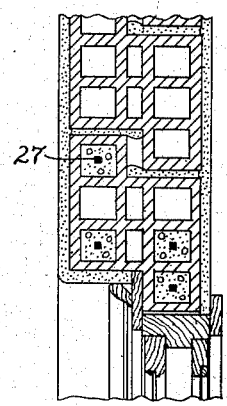
Figure 18:
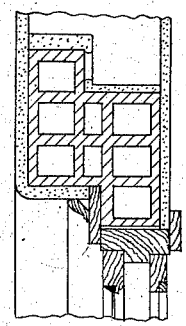
Figure 19:
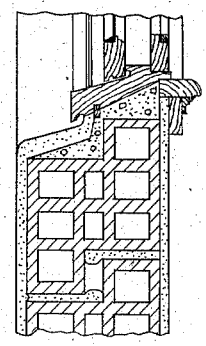

Figs. 17, 18, and 19, are sectional views, respectively, of a head, jamb, and sill section of a casement window construction, showing the use of a special form of tile.

Hollow building tile are well known in the art, and many and various forms thereof have been proposed, each having certain specific characteristics. It is well understood however that a building tile to be commercially valuable has to lend itself to the contemplated building operation with the minimum of labor and expense, as well as possessing inherent characteristics of strength, weight, and insulating property.

The best tile as commercially accepted are of the interlocking type, and have their voids to extend horizontally of the wall to avoid the well-known and objectionable circulation incidental to vertical voids.

The best commercially successful hollow tile may and do possess the inherent qualifications noted, but they lack an important characteristic which renders their use much more costly in building operations than is now known to be necessary. This important detail lacking in the best known hollow tile in commercial use, is that while each such tile unit is complete in itself, it is only adapted for use as such complete unit, or at least at best in one or two divisions thereof. This necessitates the making up of what is known as special form tile, for the many building details where the main unit tile could not be used. Therefore in building structures with such tile, the tile manufacturers are called upon for the necessary number of each special form of tile, requiring special tile making on his part, and serious delay and inconvenience to the builder if all such special tile forms are not at hand when wanted. Frequently a manufacturer will not have in hand the desired number of special forms to fill the particular order, and hence delay occurs. Furthermore, an insufficient number of special forms of tile may be delivered, incident to the liability of such to breakage in transportation and delivery. The tile mason is always delayed by the delivery to the point at which he is working of the special form of tile. There is in this special form tile an even more serious objection, that the tile mason, unless he is familiar with such special forms, is frequently at a loss as to how to build them in, and many manufacturers recognizing this difficulty maintain experts whose duty it is to instruct the tile masons on the particular work as to the use and applications of the special forms. All of these objections are a constant, and heretofore unavoidable, source of expense to the manufacturer and builder, and they are entirely avoided through the use of the improved tile forming the subject matter of this application, the fundamental essential of which is that the tile constructed with all the desirable characteristics of a tile unit, and usable as such, may be broken up by the ordinary mason to produce any and all of the special forms that may be required in the building construction, and in such special forms, possess all of the desirable characteristics of the special form unit.

With the improved tile, the manufacturer makes but one unit; the builder has to order but a specified number of the one unit; the tile mason always has at hand not only the main tile unit, but any and all the special forms which he may require as his work proceeds; and as the tile mason forms the special units from the main unit he of course understands their application and building in.

Figure 1:
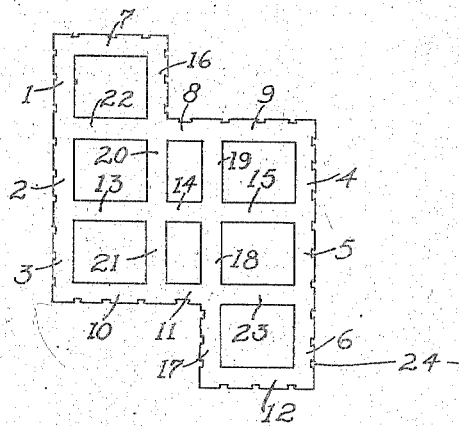
Figure 1 is an end elevation of the improved hollow tile.
Figure 2:
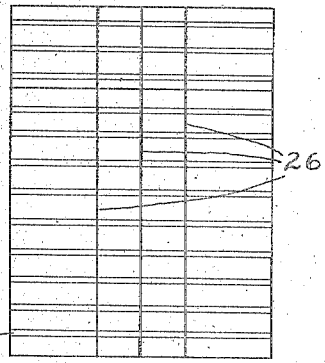
Fig. 2 is a front elevation of the same.
Figure 3:
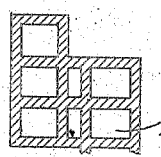
Figure 4:
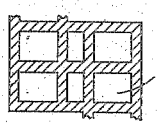
Figure 5:
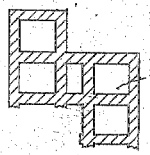
Figure 6:
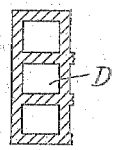
Figure 7:

The tile unit illustrated in Figs. 1 and 2 of the drawings is so far as known the only form of unit which will answer the requirements noted, and therefore while this application is constructively limited to such form, the invention is necessarily broader than the particular form here involved, as the claims will clearly indicate.

In Fig. 1, which is an end elevation of the tile it will be noted that the tile comprises essentially substantially duplicate front and rear sections, and an intermediate comparatively narrow section, joining the front and rear sections. The front and rear sections so called each includes three horizontal voids, substantially equal in area, while the intermediate section has two voids equal in height, but of less width than the other voids. To form the interlocking feature the front and rear sections are vertically offset the distance of one void, so that the voids of the intermediate section aline respectively with an end and an intermediate void of the front and rear sections.

Specifically, the tile thus formed has an outer wall involving the face walls 1, 2, and 3, of one, either front or rear section, the end walls 7 and 10, and the inner side wall 16 of the projecting end of such section, and the corresponding face walls 4, 5, 6, 9, 12, and 17 of the other section, rear or front and also the upper or lower face walls 8 and 11 of the intermediate section.

The three voids in the front and rear sections and the two voids of the intermediate section require for their formation, internal webs, and it is in the relative disposition of these webs that the important feature of the invention resides. Such webs 13 and 22 in an outer section, front or rear, are respectively arranged in direct alinement with and form an exact continuation of an outer wall of the tile unit, as 9 and 8, and an internal web of the intermediate and remaining outer section, front or rear, as 14 or 15. The remaining intermediate web 23 of the remaining outer section is in direct alinement with and forms a continuation of the outer wall of the tile unit, indicated as the end walls of the intermediate and outer section, that is walls 11 and 10.

The intermediate section, arranged as described, has its what may be termed side walls 18 and 19 and 20 and 21 wholly interiorly of the tile unit, these walls forming the inner sides of the outer sections. Such walls, one including the sections 18 and 19, and the other the sections 20 and 21, form therefore interior vertical webs of the tile unit, and as shown are respectively in alinement with and form direct continuations of those wall portions of the outer sections of the unit which form parts of the outer wall of the unit, as 17 and 16.

The structural feature of supreme importance involved in the disclosure above is the fact that each and every interior web, horizontal and vertical, is continued throughout the dimensions of the tile unit, and with the exception of the central transverse web made up of the walls 13, 14, and 15, each and every such interior web is in alinement with and forms a direct continuation of a normally outer wall portion of the tile unit.

As a result of this it is at once apparent that the tile unit may be divided so that any interior web may be utilized as an exterior wall of the resultant form, and that when so divided such exposed interior web forms a continuation of a normally outer wall of the tile unit to thereby maintain the continuity of the outer wall of such resultant form, as is absolutely essential. This operation results from dividing the tile along any interior web, except the central web, and the tile unit may be divided in whole or in part to utilize the central web, or a part thereof, as an exterior web for certain special forms.

The external walls of the tile are scored as at 24, and these scorings may be formed to form substantial recesses for bonding the surface material which is applied to the tile. Primarily, however, these scorings are to permit convenient dividing of the tile, and such scorings 24, as well as vertical scorings or lines of weakening, as 26, are arranged for convenient dividing of the tile along the line of the internal webs, or substantially along such lines as above referred to.

Some of the special forms of hollow tiles required in a building operation involving the tile unit, and into which the improved tile unit may be readily divided, are indicated at A, B, C, D, and E of the drawings, and that indicated at C shows one of the special forms where the central web is used as an outer wall.

Figs. 8, 9 and 10 show wall structures of different thickness, and certain special forms, used with the tile unit, as indicated therein.

The remaining figures of the drawings show the use of the tile unit, in various building uses, with certain special forms, as indicated.

What is claimed as new, is:—

1. A tile unit comprising a plurality of hollow offset body parts, angularly-related webs in such body parts in alinement with and forming direct line continuations of the normally outer wall section of another body part, whereby such unit may be divided along the line of any web to form such webs as an outer wall of a special form tile, such division including a normally outer wall of the tile unit.

2. A tile unit comprising a plurality of hollow body parts offset to provide an interlocking tile, vertical and horizontal internal webs in such body parts forming direct line continuations of the external walls of other body parts, said tile unit being scored to permit division of the tile along all or part of any internal web.

3. A hollow tile unit having an exterior wall of approximately Z-form and having vertical and horizontal internal webs, each of which forms a direct line continuation of a portion of such external wall of the unit, and an additional web wholly internal of the unit and continued as a direct wall structure through one full dimension of the tile unit.

4. A hollow tile comprising two offset hollow body portions spaced apart, each hollow body portion having a web forming a direct line continuation of an exposed wall of the other body portion, all webs and walls terminating in a common plane at each end of the block.

In testimony whereof I have hereunto set my hand at San Diego California this 11th day of September 1918.

RICHARD S. REQUA,